Patented Apr. 14, 1936

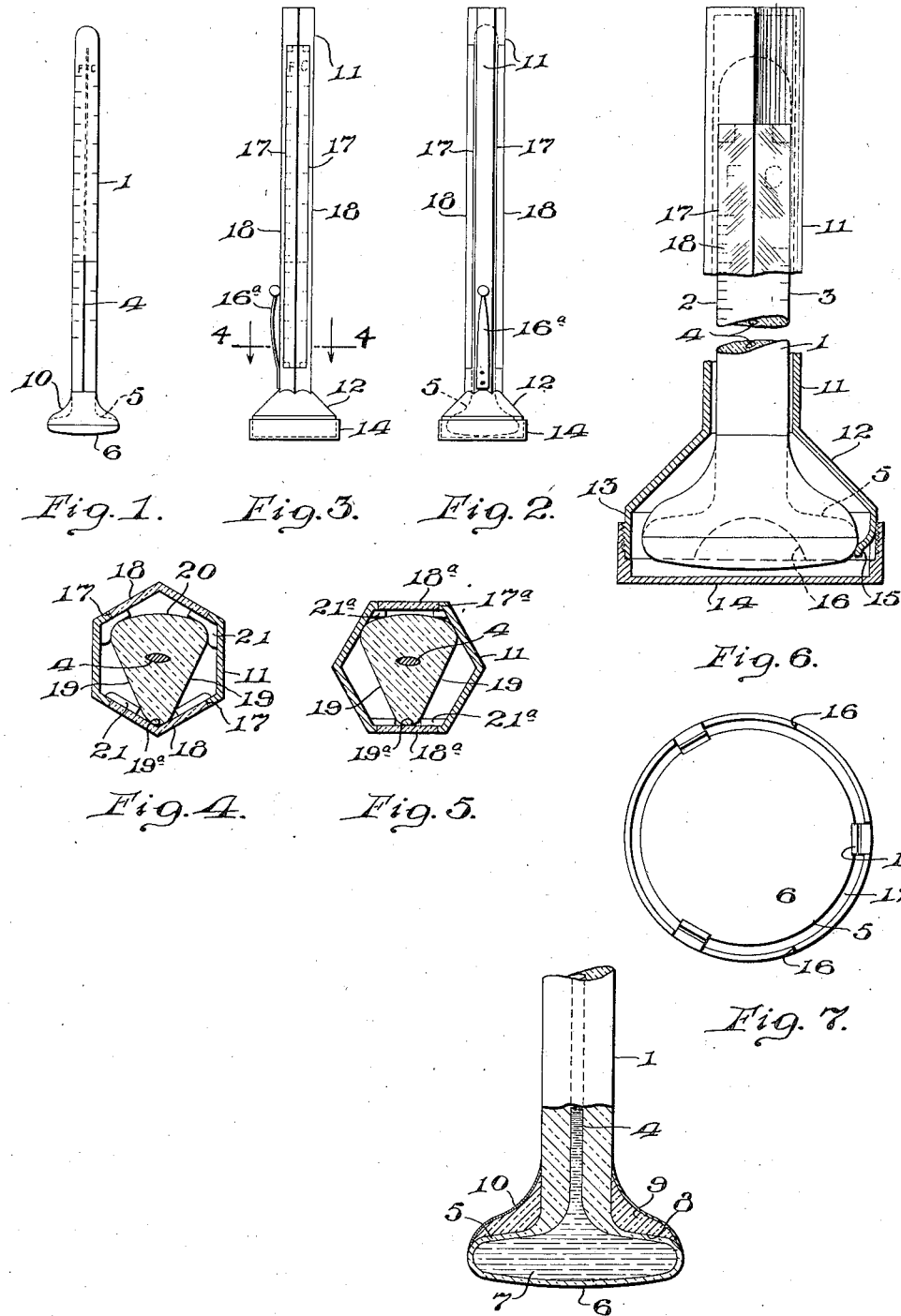

2,037,201

UNITED STATES PATENT OFFICE 2,037,201

CLINICAL SURFACE THERMOMETER

Leonard G. Rowntree, Philadelphia, Pa.

Application April 3, 1933, Serial No. 664,168

2 Claims. (Cl. 73—52)

The object of the invention broadly is to provide improvements in thermometers, but more especially in the so-called clinical surface thermometers, which are used by doctors, nurses and others, for determining the internal temperature of a patient from an external surface.

Another object is to provide in combination with a thermometer of this class a protective container which can be either removed when desired, or may be retained upon the thermometer while the latter is in normal use.

A further object is to provide a container for the above-mentioned purpose, which is transparent throughout its length, or which if opaque is provided with suitable apertures thru which the instrument may be read, or in which latter instance said apertures are spanned by transparent closure elements.

Still another object is to provide in such an instrument, the combination of the usual elongated stem, a transversely enlarged bulb of substantially disc shape having an exposed relatively flat or slightly convexed heat-absorbing or diffusing surface, and a covering of suitable heat-insulating material for and secured to the other surfaces of said bulb, together if desired with a retaining and protective covering for such first covering.

And a still further object is to provide, in such combination of thermometer and container, one or more means to yieldingly secure said thermometer within and against accidental separation from said container, yet to permit them to be readily separated whenever desired and without affecting one or the other.

With these and other objects in mind, the invention comprises further details of construction and operation, which are fully brought out in the following description, when read in conjunction with the accompanying drawing, in which Fig. 1 is an elevational view of a thermometer comprising one embodiment of the invention;

Fig. 2 is a side elevation of the same within a windowed container;

Fig. 3 is a front elevation of the combined structure of Fig. 2;

Fig. 4 is a horizontal transverse section on the line 4—4 of Fig. 3;

Fig. 5 is a section similar to Fig. 4 but showing a slightly modified arrangement of the thermometer within its container;

Fig. 6 is an enlarged fragmentary view of the thermometer and container, the former being in elevation, while the latter is partly in elevation and partly in section;

Fig. 7 is a bottom plan view of the thermometer within its container, but with the cover of the latter removed;

Fig. 8 is a fragmentary view of the bulb end of the thermometer, partially in diametrical section.

Referring to the drawing, the preferred embodiment of thermometer used embodies a stem 1, upon which any suitable scale may be used, such as either or both Fahrenheit and centigrade scales 2 and 3, respectively, with relation to the usual column 4 of mercury, spirits, or other desired thermo-expansible liquid. The normal lower end portion of the instrument comprises a transversely extended, hollow disc-like bulb 5, characterized by a flattened, or slightly convex, heat-absorbing or diffusing wall surface 6, within which is the expansible and contractible liquid reservoir 7.

The normal upper surface 8 of said bulb and the adjacent lower portion of the stem 1 are preferably covered by a permanent body of any suitable heat-insulating material 9, which if desired may be protected and retained in fixed relation with the said stem and bulb by means of a suitable covering 10, of glass, enamel, or other suitable substance. Thus, with this construction, the instrument may be used in an unlimited range of atmospheric temperatures, and only the temperature of the surface in contact with the bulb wall 6 will be effective upon the liquid within said bulb.

Referring now to Figs. 2, 3, 4, 6 and 7, a container for the improved thermometer comprises an opaque case, in turn formed of a hollow tubular section 11, of hexagonal, circular, or other desired cross section, within which the stem 1 of the instrument may be normally positioned. The lower portion of this tubular section merges into a conical section 12, normally surrounding the upper portion of the thermometer bulb, and finally terminating downwardly in a cylindrical section 13, the outer surface of which may be provided with threads for the detachable connection thereto of a cap or cover 14, while said cylindrical section is also provided with one or more radially inwardly extending resilient fingers 15, for yielding frictional engagement with the bulb 5, and with one or more cut-out regions 16 for the entrance of one's finger nail, or other means of extracting the instrument from within its case, until its bulb is free from engagement with the finger or fingers 15, after which the instrument is free to slide out by gravity only. The case may also, but need not, be provided with a garment-engageable clip 16a.

Referring to Figs. 4, 5, and 6 the tubular case section 11 may be provided with a pair of oppositely positioned window apertures 17 or 17a, of any desired shape, and in which are secured transparent elements 18 and 18a, respectively, of such shape and cross section as to conform in part or wholly with the adjacent portions of said case, or either or both type of windows may be left open entirely, if so preferred. The cross section of the thermometer stem illustrated is that of the common instrument of this character merely enlarged, and it will be noted that it is substantially triangular in cross section, having a pair of relatively flat, angularly disposed surfaces 19, connected by an "angular" surface 19a which in reality is curved to such a degree as to satisfactorily magnify the liquid column 4 when viewed therethru. The remaining lateral surface 20 of the instrument stem is convex. This shape has been found to fit slidably into various shapes of tubes, but is probably better insured in its desired position with relation to said windows, by using properly spaced lugs 21 and 21a to act both as guides, and as means to positively position said window elements, when present.

Furthermore, either or both of the elements 18 and 18a may be of any available and suitable transparent substance, such as for instance glass, various cellulose derivatives, or the like. Also, instead of constructing a case of the character described, capable of merely holding a single instrument, it is obvious that a duplex case may be provided with preferably separate compartments for an ordinary clinical thermometer and the surface type of thermometer hereinbefore described.

Having thus described my invention, what I claim and desire to protect by Letters Patent of the United States is:—

1. The combination of a thermometer comprising a stem and a transversely enlarged bulb having a substantially flattened heat absorbing and diffusing surface, with a container comprising a tubular case having a window and normally inclosing said stem, and an enlarged substantially conical end portion of said case receiving substantially all of said bulb except said surface when the thermometer is not in use, a transparent covering for said window, resilient means integral with and forming an extension of said case to frictionally engage said bulb and yieldingly retain the thermometer within said case, and a removable closure for the conical end portion of said case, to normally protect said bulb.

2. The combination of a thermometer, comprising a stem and a transversely enlarged bulb having a heat-absorbing and diffusing surface, with a container comprising a case also having a transversely enlarged portion and normally inclosing said stem and substantially all of said bulb except said surface, and longitudinally fixed resilient means to yieldingly maintain said thermometer within said case.

LEONARD G. ROWNTREE.